Patented Jan. 19, 1943

2,308,988

UNITED STATES PATENT OFFICE 2,308,988

ALUMINUM STEARATE SOLUTION AND PROCESS OF PREPARING THE SAME

Kenneth N. Mathes, Schenectady, N. Y., assignor to General Electric Company, a corporation of New York No Drawing. Application December 4, 1940, Serial No. 368,501

8 Claims. (Cl. 260—22)

This invention relates to organic solutions of aluminum soaps and to methods of making the same. It is concerned particularly with aluminum soap solutions in hydrocarbon solvents and compositions containing such solutions together with alkyd resin varnishes.

An object of the invention is to produce comparatively concentrated solutions of aluminum soaps, such as aluminum stearate, aluminum palmitate, or the like, in organic solvents characterized by low viscosities heretofore unattainable.

A further object of the invention is the preparation of coating compositions comprising aluminum soaps such as aluminum stearate combined or modified with alkyd resins.

I have found that comparatively concentrated aluminum soap solutions of low viscosities heretofore unattainable may be prepared by modifying solutions of aluminum soaps, such as the stearate, in hydrocarbon solvents, such as toluol, benzol, naptha, petroleum spirits and the like with an ammonia derivative and a polar solvent. Suitable ammonia derivatives include ammonium stearate, ammonium hydroxide, ammonia (hydrogen amine) organic derivatives of ammonia, i. e. organic amines, or combinations thereof. The preferred polar organic solvents include the lower aliphatic alcohols, cresylic acid, and nitrobenzene.

Such solutions are particularly useful as waterproofing or textile sizing agents for glass fiber, cotton, silk or other woven or matted fabrics. When incorporated into or modified with alkyd resin varnishes, coating compositions are obtained exhibiting improved electrical properties even after prolonged exposure to moisture. The incorporation of the aluminum stearate solutions into such varnishes results in little, if any, increase in the viscosity of the usual varnishes for the same total solid content.

One method of preparing aluminum soap solutions, such as aluminum stearate solutions, in accordance with the present invention, comprises the addition of finely divided aluminum stearate to an organic solvent such as toluol or petroleum spirits until a mixture of the desired concentration is obtained followed by the bubbling of ammonia gas therethrough until the desired amount of ammonia has been absorbed. During the introduction of the ammonia, it will be found that the mass gradually thickens to a pasty consistency until it is no longer able to absorb ammonia for obvious physical reasons. Although for most purposes sufficient ammonia has been added when such conditions are obtained, it may be desirable that more ammonia should be added. This can be accomplished by carefully heating the suspension to a temperature at which it becomes clear and rather viscous (approximately 65° C. for toluol and 80° C. for petroleum spirits) and thereafter introducing additional ammonia. Addition of ammonia at such elevated temperatures rapidly reduces the viscosity of the solution. However, the ultimate reduction in viscosity either with the suspension which has been treated with ammonia only in the cold or with the solution which has received a further addition of ammonia at elevated temperatures is obtained only by the further incorporation of the previously mentioned polar solvents, particularly the lower aliphatic alcohols, such as ethyl alcohol.

In certain instances it may be necessary to add the alcohols while hot. This is generally true of the aluminum stearate-ammonia complexes prepared by passing ammonia gas into a cold solution of the stearate which generally must also be warmed to the clear viscous state before addition of the polar solvent.

It was at first supposed that the marked reduction in viscosity upon the addition of the polar solvent might be attributed solely to a diluent action. However, after removing as much of the added alcohol or other polar solvent as possible by heating the solution above the boiling point of the alcohol it was found that little, if any, precipitate appeared upon cooling apparently indicating that the aluminum stearate remains in solution due to the dipole action of the alcohol.

That both ammonia or an amine and a dipole solvent such as alcohol are essential to the preparation of my low viscosity soap solutions is shown by the fact that the mere addition of alcohol to a suspension of aluminum stearate in a hydrocarbon solvent does not produce any appreciable lowering of the viscosity of the suspension or solution of the soap. Upon heating such mixtures, the alcohol readily separates and a stiff gel of aluminum stearate forms even though alcohol and toluol are ordinarily completely miscible.

The amount of alcohol, or other polar solvent, to be added for the purpose of obtaining a desired viscosity depends largely on the amount of ammonia or amine previously introduced into the aluminum stearate composition. Generally the maximum amount of alcohol which can be added is about 20 per cent by weight of a 20 per cent aluminum stearate solution in an organic solvent such as toluol. An excess of alcohol or other polar solvent produces an unstable solution again having a marked tendency towards gelation.

Cresylic acid may be readily substituted for the alcohols and should be used in comparatively larger amounts. When the resulting suspensions or solutions are intended for electrical applications, alcohol is preferred as the dipole solvent.

To illustrate further the relative effects of the ammonia and the polar solvent, it may be noted that whereas a 20 per cent aluminum stearate solution in toluol which has been saturated with ammonia at 80° C. required the addition of only 5 per cent ethyl alcohol to obtain a certain viscosity (25 centipoises), a similar solution saturated with ammonia at room temperature required 15 per cent alcohol while a third solution of the same composition except that it was treated with ammonia only until thickening began at room temperature required almost 20 per cent alcohol to obtain the same viscosity.

Ammonium stearate may be substituted for part or all of the ammonia used in preparing my solution. However, the amount of ammonium stearate used should not exceed 25 per cent of the total aluminum stearate. With excessive amounts precipitation occurs, probably due to the limited solubility of ammonium stearate in the organic solvents used.

A third modification of my method for introducing the ammonia complex into the aluminum stearate solutions comprises wetting the desired amount of aluminum stearate with about its own weight of solvent, such as naphtha, to form a thick smooth paste and thereafter adding concentrated ammonium hydroxide in an amount approximately one-tenth that theoretically calculated to react with the aluminum stearate to produce aluminum hydroxide and ammonium stearate. A stiff dough results. The further addition of solvent to this mass results in the formation of a translucent solution which, upon the addition of a polar solvent, such as alcohol, is transformed into the low viscosity solution of my invention particularly if the solution is heated slightly prior to the addition of the alcohol. Prior to the addition of the polar solvent, i. e. an alcohol, a 10 per cent aluminum stearate solution in naphtha prepared in this manner has a viscosity less than that of a 3 per cent aluminum stearate solution in naphtha prepared without the addition of ammonia.

The substitution of the various other ammonia derivatives such as organic amines, including morpholine, diethylamine, triethanol amine or the like, for the ammonia, that is, for the hydrogen-amine, is also within the scope of my invention. Organic amines should ordinarily comprise from ½ to 1 per cent by volume of the total solution. The same marked decrease in viscosity upon the addition of the polar solvent which occurs in the ammonia treated solutions also takes place with the amine modified soap solutions. With certain of the stronger amines such as ethylene diamine, there appears to be a strong tendency for the aluminum stearate to be broken down probably into aluminum hydroxide and the corresponding aluminum amine stearate. However, the addition of a small amount of zinc stearate, for example, about one part zinc stearate for each ten parts of aluminum stearate, has been found to prevent this decomposition and to provide a more stable solution capable of forming coatings of improved electrical properties.

Although I do not care to be limited thereby, a possible explanation for the mechanism involved in the phenomena encountered in the preparation of my aluminum stearate solutions is that the addition of the ammonium ion results in the formation of the more soluble complex aluminum ammonium stearate or aluminum amine stearate and prevents or breaks up the long miscelles probably formed in ordinary aluminum stearate solutions by the joining of —COO metal groups to form lyophilic bodies. The polar solvent alone or in cooperation with the ammonium ions probably further increases the solubility of these complexes or otherwise reduces the viscosity of the solutions possibly due to its dipole interaction.

Aluminum stearate coatings or films deposited from any of the above described solutions show less tendency to dust, i. e. form a more coherent and adherent film than previous aluminum stearate coatings. Such films may be plasticized with ordinary plasticizers which may or may not, in themselves, serve as the polar liquid in the original solution. Tricresyl phosphate exhibits such properties.

The aluminum stearate solutions of my invention when added to petroleum oils produce a lubricating material showing little change in viscosity over a range of temperatures. Such material may be used in dashpots and the like.

An important aspect of my invention is the preparation of varnish compositions comprising aluminum stearate and alkyd resins which compositions upon hardening produce coatings characterized by high dielectric breakdown strengths and high surface resistivities, particularly under high humidity conditions.

Varnish compositions in which the aluminum stearate comprises up to 50 per cent of the base content may be prepared by mixing any of the above described aluminum stearate solutions directly with the alkyd resin varnishes and thereafter adjusting the viscosity of the resulting composition to that necessary for any particular application. For example, a 20 per cent aluminum stearate solution may be mixed in a 1 to 1 ratio with an alkyd resin varnish having a 50 per cent base content consisting of a 50 per cent oil length linseed oil-modified glycerol phthalate resin. Such mixtures exhibit no tendency to separate before use. Preferably the aluminum stearate solutions used for this purpose are those containing a minimum amount of ammonia or amine and a polar solvent of the alcohol type in preference to nitrobenzene, cresylic acid or the like as the latter polar solvents exhibit certain disadvantages in so far as some of the electrical properties of the resulting products are concerned. That an improved dielectric breakdown strength after exposure to moisture results from the addition of my aluminum stearate solutions to alkyd resin varnishes is shown by the following table setting forth a comparison of the breakdown strengths of various samples of glass fiber insulated wire coated with two dips of the respective hardened coating compositions and immersed in water for 24 hours.

| Sample | Dielectric breakdown ave. volts |
|---|---|
| Alkyd resin varnish—3 dips 10 sec. visc | 300 |
| Alkyd resin varnish—2 dips 15 sec. visc | 540 |
| 25% aluminum stearate, No. 2—2 dips 10 sec. visc | 710 |
| 40% aluminum stearate, No. 15—2 dips 10 sec. visc | 825 |

The alkyd resin varnish used in these tests was the above described linseed oil modified glyceryl phthalate resin varnish containing 50 per cent by weight of resin having a 50 per cent oil length. The aluminum stearate-varnish mixtures were prepared by mixing equal amounts of the specified aluminum stearate solutions and varnish. Due to the nature of the various coating compositions, the wires coated with the unmodified alkyl resin varnishes were provided with thicker surface films than those coated with the aluminum stearate-varnish mixtures. However, in spite of this fact, it will be noted that the dielectric breakdown strengths of the films comprising aluminum stearate are substantially greater than the strengths of the unmodified varnishes.

A comparable increase in surface resistivity in the aluminum stearate modified varnishes was also noted. For example, the surface resistivity of a varnish film comprising two coats of the previously described linseed oil modified glyceryl phthalate varnish after 24 hours exposure to a 90 per cent relative humidity was $2.3 \times 10^{10}$ ohms. A varnish film comprising the above mentioned resin varnish undercoat and a surface coating prepared by mixing equal portions of a 20 per cent aluminum stearate solution containing 20 percent by volume of triethanol amine and 30 per cent nitrobenzene exhibited a surface resistivity of $1.0 \times 10^{12}$ ohms after 24 hours' exposure to 90 per cent humidity. After 168 hours' exposure the respective resistivity measurements for the sample were $2.3 \times 10^{10}$ and $4.2 \times 10^{11}$ ohms for the two samples.

Although I have given as an example of my invention the preparation and properties of 1:1 mixtures of aluminum stearate solutions of 25 and 40 per cent aluminum stearate content, it is understood that the invention is not limited thereto but that the soap solutions and alkyd resins may be mixed in any desired proportions.

The resultant compositions are useful wherever a tough coating material of high surface resistivity is desired. For instance, such compositions may be used as high resistance coatings for porcelain insulators or the like where current leakage is important. Conductor coils treated with these types of aluminum stearate-alkyd resin varnishes and allowed to stand for a short time at room temperature are found to have a surface coating of partially or completely gelled material which largely prevents the loss of varnish otherwise occurring during subsequent varnish treatment without hindering the release of solvents from the underlying varnish.

What I claim as new and desire to secure by Letters Patent of the United States, is:

1. A composition of matter comprising a solution of about 20 per cent aluminum soap in a hydrocarbon solvent, a substance selected from the group consisting of ammonia and organic amines and the stearates of ammonia and organic amines, and from 5 to 20 per cent by weight of a lower aliphatic alcohol based on the weight of the aluminum soap-hydrocarbon solvent mixture.

2. A liquid composition of matter comprising a mixture of (1) a solution of about 20 per cent of an aluminum soap in a hydrocarbon solvent therefor, a substance selected from the group consisting of ammonia, organic amines, and stearates of ammonia and organic amines, and from 5 to 20 per cent by weight of a lower aliphatic alcohol based on the weight of the aluminum soap-hydrocarbon solvent mixture and (2) an oil-modified glycerol phthalate resin varnish.

3. A composition of matter comprising a mixture of equal parts of (1) a solution of about 20 per cent aluminum stearate in a hydrocarbon solvent, ammonia, and from 5 to 20 per cent by weight of a lower aliphatic alcohol based on the weight of the aluminum stearate-hydrocarbon solvent mixture, and (2) an oil-modified glycerol phthalate resin varnish.

4. A composition of matter comprising a solution of about 20 per cent aluminum soap in a hydrocarbon solvent, zinc stearate, an aliphatic diamine, and from 5 to 20 per cent by weight of lower aliphatic alcohol based on the weight of the aluminum soap-hydrocarbon solvent mixture.

5. A liquid composition of matter comprising about 20 per cent aluminum stearate solution in a hydrocarbon solvent, from one-half to one per cent of an organic amine, and from 5 to 20 per cent by weight of ethyl alcohol based on the weight of the aluminum stearate-hydrocarbon solvent mixture.

6. In the process of making an aluminum stearate solution, the steps which comprise forming a mixture of aluminum stearate and a hydrocarbon solvent containing about 20 per cent aluminum stearate, saturating said mixture with ammonia gas and thereafter adding sufficient ethyl alcohol to said mixture to obtain a solution of relatively low viscosity, the amount of said alcohol being from 5 to 20 per cent by weight of the aluminum stearate-hydrocarbon solvent mixture.

7. The method of making an aluminum soap solution which comprises heating a mixture of about 20 per cent aluminum soap and an organic hydrocarbon solvent to an elevated temperature below the boiling point of the solvent, introducing ammonia gas into the heated mixture, and thereafter adding from 5 to 20 per cent by weight of a lower aliphatic alcohol to said heated mixture to obtain a clear solution of relatively low viscosity.

8. A low viscosity aluminum stearate solution comprising (1) an aluminum stearate-hydrocarbon solvent mixture saturated with ammonia gas and containing about 20 per cent aluminum stearate, and (2) from 5 to 20 per cent by weight of a lower aliphatic alcohol based on the weight of the aluminum stearate-hydrocarbon solvent mixture.

KENNETH N. MATHES.